US 6,851,075 B2

(12) United States Patent
Ur et al.

(10) Patent No.: US 6,851,075 B2
(45) Date of Patent: Feb. 1, 2005

(54) RACE DETECTION FOR PARALLEL SOFTWARE

(75) Inventors: Shmuel Ur, D.N. Misgave (IL); Eitan Farchi, Pardes Hanna (IL); Gil Ratsaby, Nazereth Ilit (IL)

(73) Assignee: International Business Machines Corporation, New York, NY (US)

( * ) Notice: Subject to any disclaimer, the term of this patent is extended or adjusted under 35 U.S.C. 154(b) by 570 days.

(21) Appl. No.: 10/035,422

(22) Filed: Jan. 4, 2002

(65) Prior Publication Data

US 2003/0131283 A1 Jul. 10, 2003

(51) Int. Cl.[7] .............................................. G06F 11/00
(52) U.S. Cl. ........................................ 714/36; 717/124
(58) Field of Search ............................. 714/36, 38, 37, 714/12, 47; 717/124, 125, 127, 128, 149

(56) References Cited

U.S. PATENT DOCUMENTS

| | | | |
|---|---|---|---|
| 6,286,130 B1 * | 9/2001 | Poulsen et al. | 717/119 |
| 6,343,371 B1 * | 1/2002 | Flanagan et al. | 717/124 |
| 6,772,367 B1 * | 8/2004 | Tarafdar et al. | 714/11 |
| 2002/0133806 A1 * | 9/2002 | Flanagan et al. | 717/123 |
| 2003/0056149 A1 * | 3/2003 | Hue | 714/38 |
| 2003/0097653 A1 * | 5/2003 | Kim et al. | 717/160 |

OTHER PUBLICATIONS

U.S. Appln. No. 09/731,387, entitled "Interleaving Based Coverage Models for Concurrent and Distributed Software", 2000.
U.S. Appln. No. 09/327,379, entitled "A Timing Related Bug Detector", 1999.
Choi et al., "Deterministic Replay of Java Multithreaded Applications", *ACM SIGMETRICS Symposium on Parallel and Distributed Tools (SPDT)*, Aug. 1998, pp. 48–59.
Michiel Ronsee et al., "Non–intrusive on–the–fly Data Race Detection Using Execution Replay", Published by Proceedings of the Forth International Workshop in Automated Debugging (AADEBUG2000), Aug. 2000.
Choi et al., "Deterministic Replay of Distributed Java Applications", Published in proceedings of the SIGMETRICS Symposium on Parallel and Distributed Tools, Aug. 1998.
Hembold et al., "A Taxonomy of Race Detection Algorithms", doctoral dissertation to the University of California, Santa Cruz, on Sep. 28, 1994.
Netzer et al., "Improving the Accuracy of Data Race Detection", Published in proceedings of the third ACM SIGPLAN Symposium on Principles and Practice of Parallel Programming, Apr. 1991.
Netzer et a;., "What are Race Conditions? Some Issues and Formalizations", in ACM Letters on Programming Languages and Systems, Mar. 1992.
Lewis et al., "Threads Primer", Appendix E, Published by Prentice Hall, 1996.
Orit Edelstein et al., "Multithreaded Java Program Test Generation", presented at the Joint ACM Java Grande—ISCOPE 2001 Conference at Stanford University in Jun. 2001.

* cited by examiner

Primary Examiner—Nadeem Iqbal
(74) Attorney, Agent, or Firm—Browdy and Neimark, P.L.L.C.

(57) ABSTRACT

A method for race detection in parallel software, including performing an execution of software under test (SUT), the SUT having an expected outcome. The method further includes detecting a race condition in the SUT responsive to a first interleaving generated during the execution, replaying the first interleaving to a start-point of the race condition, and imposing a second interleaving at the start-point of the race condition. The method also includes determining a second-execution outcome of the SUT responsive to the second interleaving, and comparing the expected outcome with the second-execution outcome.

47 Claims, 5 Drawing Sheets

RACE DETECTION FOR PARALLEL SOFTWARE

FIELD OF THE INVENTION

The present invention relates generally to testing software, and specifically to testing multi-threaded, concurrent, and/or distributed software.

BACKGROUND OF THE INVENTION

The purpose of testing software is to provide an assurance that the software performs as specified, without defects. Methods for testing sequential software, i.e., software which runs on one platform and/or which has only one thread, are well known in the art. Testing non-sequential software, i.e., multi-threaded, concurrent, and/or distributed software that contains one or more threads or processes running concurrently, is more difficult. Such non-sequential, or parallel, software may contain defects resulting specifically from concurrent execution, such as "race conditions" (explained in detail subsequently). Methods for detecting race conditions are known in the art; however, these methods frequently report false alarms, i.e., detected race conditions that do not represent a defect.

By definition, sequential software executes in a deterministic manner. That is, given the same input, the sequence of statement execution is fixed and unvarying in repeated executions of the software. This determinism holds even in the case of interrupt-driven sequential software, where one form of input comes from unsynchronized elements external to the software such as hardware devices or a network, since the term "same input" refers not only to the content of the information but also to its timing.

Methods used for testing sequential software generally involve generating tests designed to discover faults in the software, combined with some measurement of coverage to ensure that the software is sufficiently exercised. Coverage measurement may be used to direct creation of new tests (for conditions not covered heretofore in the testing) or as a criterion for stopping the testing.

Figure 1:
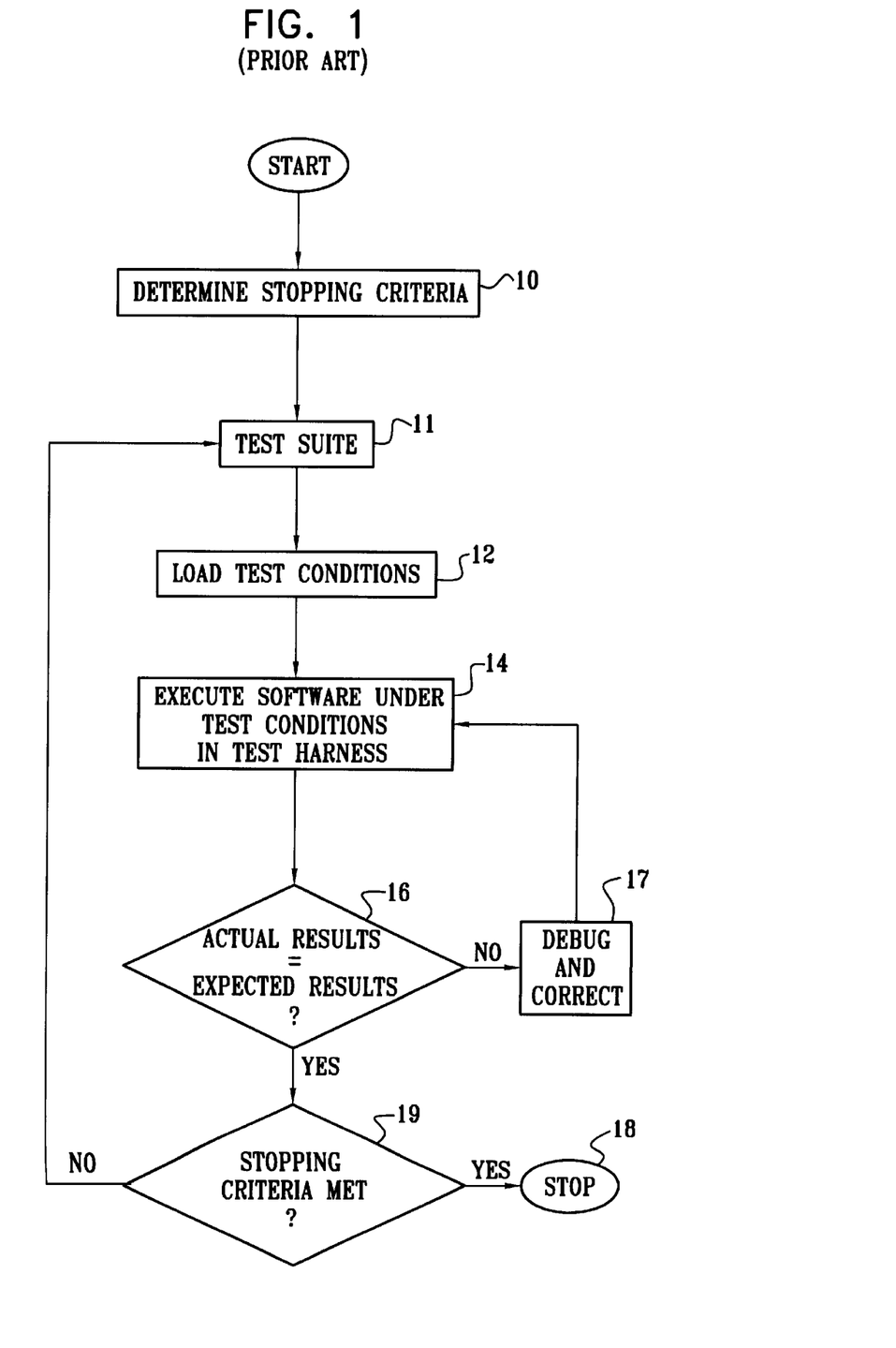
FIG. 1 is a flowchart schematically showing a general method used in testing software, as is known in the art.

FIG. 1 illustrates a general method for testing software, as is known in the art. In an initial step 10, criteria which are to be met by the testing, such as required coverage percentage, are defined. In a test construction step 11, a test suite is generated according to predetermined guidelines, by techniques known in the art. The test suite comprises a collection of test conditions, the conditions comprising information and inputs designed to exercise the software under test (SUT) in different ways, using a test harness. The test harness effects the execution of a test and typically comprises an oracle function. The oracle function determines if a test outcome is correct. The oracle may take the form of a person who examines the outcome and verifies correctness, or a software tool that compares an expected outcome to an actual result. The test conditions are loaded to the test harness in a step 12. In a step 14, the software under test is executed under the test conditions. A condition 16 checks if the result is correct, i.e., if the actual result corresponds to an expected result. If the results do not correspond, the defect is debugged and corrected in a step 17 and the execution of step 14 is repeated. After the defect has been remedied, a condition 19 checks whether the stopping criteria set in step 10 have been met, i.e., whether sufficient testing has been performed. Sufficient testing is constrained in practice by coverage metrics, time, cost, error tolerance and/or other relevant parameters for the software under test. If the stopping criteria are not met, testing continues by selecting another set of test conditions from the test suite.

In the context of the present patent application and in the claims, multi-threaded, concurrent, and/or distributed software is termed "parallel software" or a "parallel program." Parallel software comprises a plurality of threads and/or operates on a plurality of distributed platforms, so that a sequence of statement execution is no longer deterministic, but rather is dependent on scheduler decisions, order of message arrival, synchronization mechanisms, and/or relative speed of hardware involved. Whereas in sequential software a result produced by the program is uniquely determined by the inputs selected, in the case of parallel software, the result produced depends both on an input space and on an order in which different tasks implemented by the parallel software are performed. In the context of the present patent application and in the claims, an "interleaving" is assumed to be a set of information which describes a sequence in which a parallel program executed in a given execution, and the set of all possible interleavings for a parallel program is termed the "interleaving space" for the parallel program.

Figure 2:
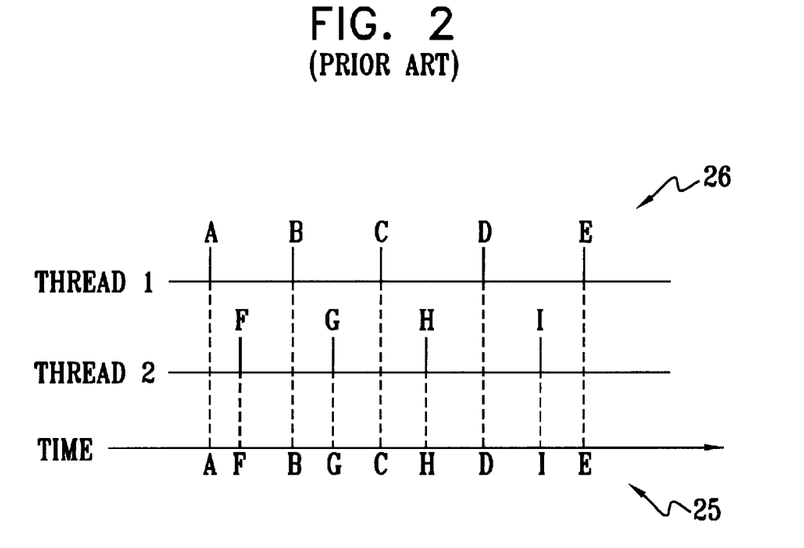
FIG. 2 is a first schematic timing diagram for a parallel program containing two threads and showing a possible interleaving, as is known in the art.
Figure 3:
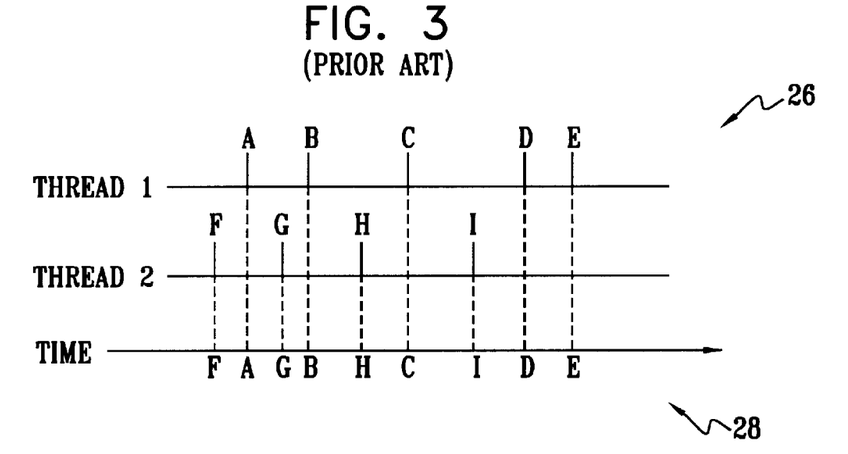
FIG. 3 is a second schematic timing diagram for the parallel program of FIG. 2, presenting an alternative possible interleaving, as is known in the art.

FIG. 2 and FIG. 3 are a first and a second schematic timing diagram for a parallel program 26 containing two threads, as are known in the art. A thread 1 comprises ordered statements or code segments denoted by {A, B, C, D, E}. A thread 2 comprises ordered statements or code segments denoted by {F, G, H, I}. A first interleaving 25 shows an order in which the program executed during a run of the software: A F B G C H D I E. FIG. 3 shows another run of the same parallel program as in FIG. 2, under the same test conditions. In the second run, a different interleaving 28 results: F A G B H C I D E.

It is known in the art that most software defects (bugs) belong to a limited number of identified classes. Some examples of these classes are failure to initialize variables, inadequate handling of boundary conditions, and array overflow or underflow. These classes of defects may appear in either sequential or multi-threaded, concurrent, and/or distributed software.

Because of the complexity introduced by the multiplicity of possible interleavings, parallel software is prey to further types of defects, in addition to those defect classes endemic to all software. In Appendix E of *Threads Primer* by Lewis and Berg, published by Prentice Hall, 1996, which is incorporated herein by reference, the authors provide a taxonomy of common bugs in parallel software, such as depending on scheduling order and not recognizing shared data. Some of these defects may cause a situation known as a "race" or a "race condition."

Race conditions occur when two or more simultaneously executing threads or processes access the same shared memory location without proper synchronization, and at least one access is a write. Synchronization refers to a method by which access to a resource, in this case, a memory location, is controlled so that each competing access or set of accesses is assured of completion, in an intended sequence, without interference. The resource is locked by a thread or process until its access is complete, assuring that no other thread or process interferes. Synchronization is achieved by explicit use of methods known in the art, such as semaphores, mutexes, and critical sections.

A distinction is made between synchronization races and data races. A synchronization race occurs intentionally in a parallel program, where there is competition among the component threads and/or processes to seize a synchronizing resource, for example, to lock a semaphore or enter a critical section. Synchronization races are considered a useful feature of parallel programs, supporting the intentionally non-deterministic behavior of the software.

A data race also contributes to the non-deterministic behavior of the software; however, a data race occurs unintentionally, generally as a result of improper (or absent) synchronization, and often signifies a defect in the software. The result produced by the program will vary from one execution to the next, based on the order in which the threads or processes accessed the shared memory location. In the context of the present patent application and in the claims, "race" or "race condition" refers to a data race, and a data race is assumed to consist of two accesses to the same memory location if at least one of the accesses is a write and the two accesses are not synchronized.

Figure 4:
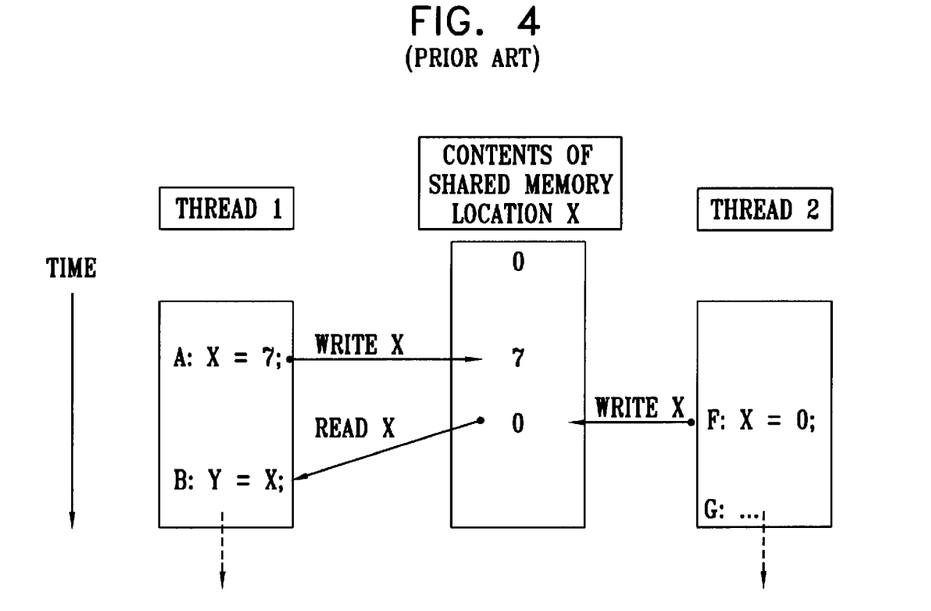
FIG. 4 is a schematic representation of a first execution of the parallel program of FIG. 2, and its effect on the contents of a shared memory location, as is known in the art.

FIG. 4 is a schematic representation of a first execution of parallel program 26, with reference to interleaving 25 (FIG. 2), as is known in the art. FIG. 4 focuses on an initial section of interleaving 25. Thread 1 contains statements A and B, Thread 2 contains statement F. In this example, statements A and F both perform a write access to a shared memory location X. Statement B reads the contents of X, which determines a program result in the example. Interleaving 25 of FIG. 2 determined the sequence of the execution and the program result. Since statement F updated X last, the program result is 0.

Figure 5:
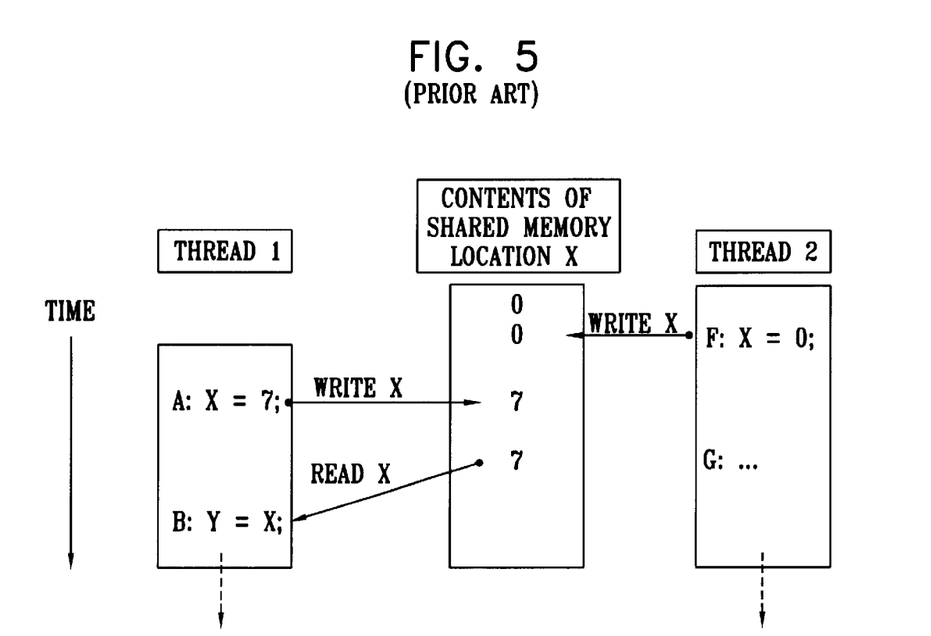
FIG. 5 is a schematic representation of a second execution of the parallel program of FIG. 2, and its effect on the contents of the shared memory location, as is known in the art.

FIG. 5 is a schematic representation of a second execution of parallel program 26, with reference to interleaving 28 (FIG. 3), as is known in the art. FIG. 5 focuses on the same initial section as FIG. 4. In interleaving 28, statement A updates memory location X after statement F, and the program result is 7.

Since statement A and statement F wrote to memory location X without proper synchronization, statement A and statement F are said to be a race. Assuming that a single correct result is defined for the program, one of the two interleavings yielded a faulty result, indicating a program defect deriving from a race condition. For example, the developer may have intended that accesses A and B in Thread 1 complete, before any other access to X occurs. The developer should have included explicit synchronization commands locking memory location X before A and after B, to prevent any intervening access explicitly.

A distinction is made between an apparent race and a feasible race. In an article entitled *What are race conditions? Some issues and formalizations* by Netzer and Miller, in ACM Letters on Programming Languages and Systems, March 1992, which is incorporated herein by reference, the authors define a feasible data race as involving events that either did execute concurrently or could have. An apparent race refers to a condition in which some implicit synchronization mechanism is used, and therefore the data race will never occur.

Practical methods for detecting race conditions are known in the art. For example, in an article entitled *Non-intrusive on-the-fly data race detection using execution replay* by Michiel Ronsse and Koen de Bosschere, published in Proceedings of the Fourth International Workshop on Automated Debugging (AADEBUG2000), August, 2000, which is incorporated herein by reference, the authors describe a tool using a three-phase approach (record, replay and detect, and identify) which employs recorded synchronization information and time-stamped shared data access information to detect data races with minimum disturbance to the parallel programs normal execution. In a doctoral dissertation submitted to the University of California, Santa Cruz, Sep. 28, 1994, entitled *A taxonomy of race detection algorithms* by Helmbold and McDowell, which is incorporated herein by reference, the authors cite a conventional classification of race detection methods (static analysis, post-mortem, and on-the-fly), then propose an alternative taxonomy based on characterization of control flow constructs and synchronization methods used in the software.

Tools for recording and replaying parallel software executions are known in the art. Such tools are useful because of the possibility of recreating the precise interleaving that was identified as producing incorrect results. In an article, *Deterministic Replay of Distributed Java Applications* by Choi, Konuru, and Srinivasan, published in Proceedings of the SIGMETRICS Symposium on Parallel and Distributed Tools, August 1998, which is incorporated herein by reference, the authors describe a system for distributed Java applications which records the "logical thread schedule information and the network interaction information of the execution, while the Java program runs . . . [and] reproduces the execution behavior of the program." In a paper entitled *Multithreaded Java Program Test Generation* by Edelstein, Fachi, Nir, Ratsaby, and Ur, presented at the Joint ACM Java Grande—ISCOPE 2001 Conference at Stanford University in June, 2001, which is incorporated herein by reference, the authors describe an architecture called ConTest, for rerunning tests under alternate scheduling decisions, which makes use of the replay technique defined by Choi, et al.

Current race detection methods frequently report false alarms. In an article entitled *Improving the Accuracy of Data Race Detection* by Netzer and Miller, published in Proceedings of the Third ACM SIGPLAN Symposium on Principles and Practice of Parallel Programming, April 1991, and which is incorporated herein by reference, the authors note that "[d]ata race reports generated by most existing methods can include potentially many artifacts, which can overwhelm the programmer with irrelevant information." A false alarm or artifact is a detected race condition that does not represent a program defect. False alarms may result from numerous causes, for example, infeasible data races, implicit synchronization, data that does not affect program outcome and/or limitations and shortcomings of the particular race detection method used.

SUMMARY OF THE INVENTION

In preferred embodiments of the present invention, a system for race detection in parallel software is defined. The system comprises a method implemented by software and/or hardware components. The method specifies a first execution of software under test (SUT) in a test harness, during which race detection and execution recording are performed. If a race condition is detected in the first execution, a second execution is performed. The second execution comprises a replay of the first execution, making use of recorded execution information to ensure that an identical interleaving occurs in the replay. The second execution halts at the point, herein termed the start-point, at which the race condition was detected. At the start-point, preferably, an alternative interleaving is forced and the second execution continues to completion.

A first outcome of the program, herein termed the first-execution outcome, is produced by the first execution. If no race was detected in the first execution, the first-execution outcome is evaluated. In the case of an incorrect first-execution outcome, a developer debugs the error. If a race was detected in the first execution, during the second execution an execution controller forces the alternative interleaving, and the replay continues to completion, generating a second-execution outcome. If the first-execution outcome and the second-execution outcome are both correct, the detected race is not identified as a defect. However, if the one or both of the first-execution outcome and the second-execution outcome is incorrect, the race is a bug and requires developer attention. Testing continues in a test harness with execution of a next test case from a test suite, until predetermined stopping criteria are met.

Unlike other methods known in the art for race detection, in preferred embodiments of the present invention:

The second execution comprises a replay of the first execution using execution recording and replay techniques, up to the start-point of the race. The execution control imposes the alternative interleaving, and the first-execution outcome and the second-execution outcome determine the presence of a defect.

Each race reported is known to cause an incorrect outcome of the software, i.e., false alarms are not reported. Thus, effort involved in identifying true defects is reduced and overall software reliability is increased.

Preferably, software and/or hardware components comprised in preferred embodiments of the present invention include tools known in the art for race detection, execution recording, replay, execution control, test suite execution in a test harness, coverage monitoring, and debugging parallel software. Unlike other methods known in the art, preferred embodiments of the present invention comprise a coupling of the above-mentioned tools via a test system software interface whereby information is transferred among the tools to facilitate race condition detection and debugging.

The test system software interface enables the tools to make use of information generated by other tools in the test system software. For example, information about the location of race conditions is generated by the race detection tool, and is used by the replay tool to halt execution at the race start-point, and to activate the debugger. Also, recorded execution information provides a basis for imposing an alternative interleaving.

Preferred embodiments of the present invention enable an alternative path to be followed from the race start-point during the replay. In the alternative path, a thread-enabled debugger is invoked using the coupling, instead of the alternative interleaving being forced. With the aid of the debugger, the developer examines and debugs the possible defect. Control over the course of the second execution from this point is passed to the developer.

There is therefore provided, according to a preferred embodiment of the present invention, a method for race detection in parallel software, including performing an execution of software under test (SUT) having an expected outcome, detecting a race condition in the SUT responsive to a first interleaving generated during the execution, replaying the first interleaving to a start-point of the race condition, and imposing a second interleaving at the start-point of the race condition. The method further includes determining a second-execution outcome of the SUT responsive to the second interleaving and comparing the expected outcome with the second-execution outcome.

Preferably, performing the execution includes generating a first-execution outcome, and the method includes comparing the first-execution outcome with the expected outcome.

Further preferably, the method includes reporting the race condition as a program defect responsive to the first-execution outcome with the expected outcome comparison and the expected outcome with the second-execution outcome comparison.

Further preferably, comparing the first-execution outcome with the expected outcome includes activating a thread-enabled debugger responsive to the comparison.

Preferably, performing the execution includes recording interleaving and variable values.

Further preferably, recording interleaving and variable values includes generating a history of occurrences of values over a single execution of a test.

Further preferably, recording interleaving and variable values includes generating a history of occurrences of values over multiple executions of at least one test.

Further preferably, generating the history includes selecting a previous value and assigning the previous value to a shared memory location.

Further preferably, selecting the previous value includes selecting the value from the history of occurrences of values responsive to a frequency of occurrences of the value.

Preferably, the second interleaving includes a reversal of an order of accesses to a shared memory location generated responsive to the first interleaving.

Preferably, imposing the second interleaving includes assigning an alternative value to a shared memory location corresponding to a prior recorded value.

Preferably, the SUT includes a program having a plurality of threads.

Preferably, the SUT includes a program running on one or more central processing units (CPUs).

Preferably, the SUT includes a program running in a distributed environment.

Preferably, the race condition signifies a program defect.

Further preferably, reporting the program defect is not a false alarm.

Preferably, detecting the race condition includes identifying the race condition as a minimal race.

Preferably, performing the execution includes choosing a test condition from a predetermined test suite in a test harness tool, and executing the SUT under the test condition.

Further preferably, the predetermined test suite includes one or more test variations generated by irritators.

Preferably, performing the execution of the SUT includes establishing a predetermined coverage requirement and halting the execution after the predetermined coverage requirement has been satisfied. Preferably, performing the execution of the SUT includes establishing a predetermined stopping criterion and halting the execution after the predetermined stopping criterion has been satisfied.

Preferably, the method includes setting a breakpoint at the race condition start-point, activating a debugger, and operating the debugger so as to control continued execution of the SUT.

Preferably, the method includes providing a test system software having a plurality of software development and debugging tools chosen from a race detection tool, an execution recording and replay tool, an execution control tool, a thread-enabled debugger tool, a coverage measurement tool, and a test harness tool, and performing the execution of the SUT includes coupling the tools in a predetermined manner.

Further preferably, coupling the tools includes transferring information among the software development and debugging tools so as to perform replaying the first interleaving to the race condition start-point.

Further preferably, coupling the tools includes transferring information among the software development and debugging tools so as to perform imposing the second interleaving at the race condition start-point.

Further preferably, coupling the tools includes setting a breakpoint at the race condition start-point and activating the thread-enabled debugger tool.

Further preferably, coupling the tools includes transferring information among the software development and debugging tools so as to perform comparing the expected outcome with the second-execution outcome.

There is further provided, according to a preferred embodiment of the present invention, a method for debugging a race condition, including executing software-under-test (SUT), activating a race detection tool, a replay tool, a thread-enabled debugging tool, and a test harness tool responsive to execution of the SUT, and coupling the tools to produce a transfer of information therebetween. The method further includes debugging the race condition responsive to the transfer of information.

Preferably, the SUT includes a program having a plurality of threads.

Preferably, the SUT includes a program running on one or more central processing units (CPUs).

Preferably, the SUT includes a program running in a distributed environment.

Preferably, the race condition signifies a program defect.

Preferably, debugging the race condition includes identifying the race condition as a minimal race.

Preferably, executing the SUT includes executing the SUT under a test condition chosen from a predetermined test suite in the test harness tool.

Further preferably, the test suite includes a first plurality of test variations using irritators, and executing the SUT includes generating a second plurality of interleavings responsive to the first plurality of test variations.

Preferably, executing the SUT includes halting execution of the SUT after a predetermined coverage requirement has been satisfied.

Preferably, executing the SUT includes halting execution of the SUT after a predetermined stopping criterion has been satisfied.

Preferably, the method includes activating the thread-enabled debugging tool at a start-point of the race condition.

Further preferably, the method includes controlling continued execution of the SUT responsive to the debugging tool.

Preferably, executing the SUT includes activating an execution recorder tool, and coupling the tools includes transferring information between the execution recorder tool and at least one of the race detection tool, the replay tool, the thread-enabled debugging tool, and the test harness tool.

Further preferably, the method includes transferring information between the execution recorder, the replay tool, the test harness tool, and the race detection tool and replaying a first interleaving of the SUT to a start-point of the race condition responsive to the transferring of information.

Further preferably, the method includes activating the thread-enabled debugging tool responsive to the transferring of information.

Further preferably, the test harness tool is responsive to the transferring of information.

There is further provided, according to a preferred embodiment of the present invention, apparatus for race detection in parallel software, including a computing system which is adapted to perform an execution of software under test (SUT) having an expected outcome, detect a race condition in the SUT responsive to a first interleaving generated during the execution, and replay the first interleaving to a start-point of the race condition. The apparatus further includes a computing system which is adapted to impose a second interleaving at the start-point of the race condition, determine a second-execution outcome of the SUT responsive to the second interleaving, and compare the expected outcome with the second-execution outcome.

There is further provided, according to a preferred embodiment of the present invention, apparatus for debugging a race condition, including a computer system which is adapted to execute software-under-test (SUT) and a plurality of software tools comprising a race detection tool, a replay tool, a thread-enabled debugging tool, and a test harness tool, the tools being activated by the computer system responsive to the execution of the SUT. The apparatus further includes a coupling which connects the plurality of tools to produce a transfer of information therebetween responsive to the execution of the SUT, so that the computer system is able to debug the race condition responsive to the transfer of information.

There is further provided, according to a preferred embodiment of the present invention, a computer software product for race detection in parallel software, including a computer-readable medium having computer program instructions recorded therein, which instructions, when read by a computer, cause the computer to perform an execution of software under test (SUT) having an expected outcome, detect a race condition in the SUT responsive to a first interleaving generated during the execution, replay the first interleaving to a start-point of the race condition, impose a second interleaving at the start-point of the race condition, determine a second-execution outcome of the SUT responsive to the second interleaving, and compare the expected outcome with the second-execution outcome.

There is further provided, according to a preferred embodiment of the present invention, a computer software product for debugging a race condition, including a computer-readable medium having computer program instructions recorded therein, which instructions, when read by a computer, cause the computer to execute software under test (SUT), activate a race detection tool, a replay tool, a thread-enabled debugging tool, and a test harness tool responsive to execution of the SUT, couple the tools to produce a transfer of information therebetween, and debug the race condition responsive to the transfer of information.

The present invention will be more fully understood from the following detailed description of the preferred embodiments thereof, taken together with the drawings, in which:

DETAILED DESCRIPTION OF PREFERRED EMBODIMENTS

Figure 6:
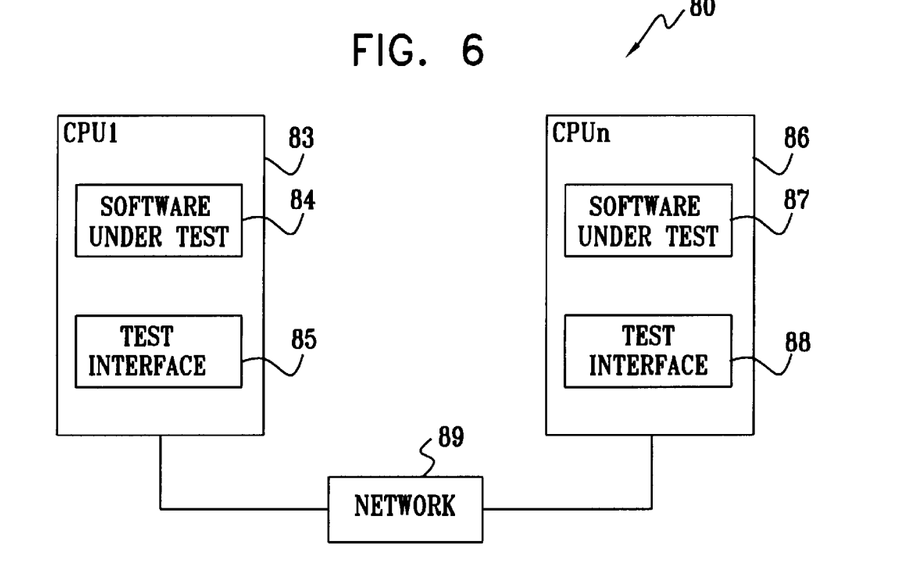
FIG. 6 is a schematic block diagram depicting a hardware and software context of a test system for a parallel software under test (SUT), according to a preferred embodiment of the present invention.

Reference is now made to FIG. 6, which is a schematic block diagram depicting a hardware and software configuration of a test system for a parallel program 80, according to a preferred embodiment of the present invention. Program 80, also herein termed software under test (SUT) 80, comprises a multi-threaded, concurrent, and/or distributed program which has code segments (threads and/or processes) running on one or more of n different central processing units (CPUs), where n is any whole number greater than or equal to 1. Typically, n is a function of system architecture, hardware constraints, and/or other considerations known in the art. Program 80 comprises a first process or thread of program 80, denoted SUT 84, and a second process or thread, denoted SUT 87. A CPU1 83 runs SUT 84, together with any operating system or other basic functions, such as a scheduler or input/output (I/O) system. CPU1 83 also runs a test interface 85 comprising components used to execute tests, record and replay an interleaving, detect races, force an interleaving, operate a debugger, and, optionally, measure coverage. A CPUn 86 similarly runs SUT 87, as well as a test system interface 88, comprising at least some components generally similar to those of interface 85. CPU1 through CPUn are coupled together by a network 89, which may be a distributed network, shared memory, and/or data bus, or any other form of coupling between CPUs known in the art, which allows CPUs to communicate.

Alternatively, SUT 87 and SUT 84 are implemented on CPU1 as an m-threaded program where m is any whole number greater than or equal to 2. Implementation methods for test interfaces 85 and 88 include, but are not limited to, source code instrumentation, creation of additional threads or processes, and/or operating system hooks. The hardware contexts for the test interfaces include, but are not limited to, CPU1 83 through CPUn 86, an additional CPU, and/or hardware comprised in network 89. Interfaces 85 and 88 comprise and implement a test system software 102, described in more detail with reference to FIG. 7 below.

Test system software 102 for carrying out testing functions comprised in test interface 85 and test interface 88, as described herein, can be supplied in electronic form or on tangible media such as a magnetic storage disk or a compact disc which are readable by a computer, or other means known in the art for permanent storage of electronic data.

Figure 7:
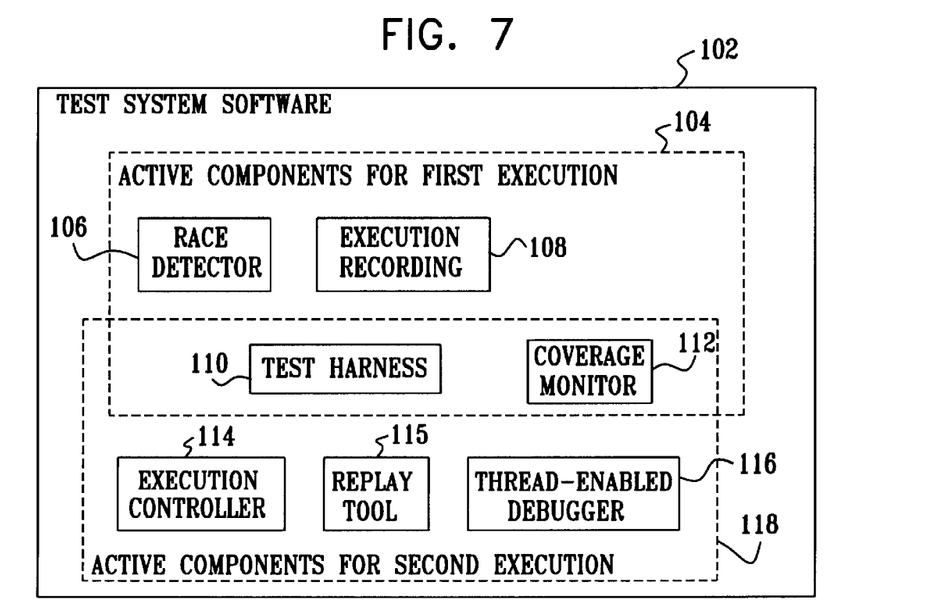
FIG. 7 is schematic block diagram showing software components of the test system of FIG. 6, according to a preferred embodiment of the present invention.

FIG. 7 is a schematic diagram showing software components of test system software 102, according to a preferred embodiment of the present invention. Test system software 102 comprises two intersecting subsets of software components: active components 104 for a first execution of program 80, and active components 118 for a second execution of program 80. First execution and second execution refer to phases in a running of a test according to a preferred embodiment of the present invention, as described with reference to FIG. 8 below.

Active components 104 comprise a race detector 106, an execution recorder 108, a test harness 110, and, preferably, a coverage monitor 112, all of which components are known in the art. Race detector 106 comprises a software tool designed to detect data race conditions "on-the-fly." Execution recorder 108 provides a method for tracing execution sequences and variable values for an execution of SUT 84 and SUT 87. Typically, the execution recorder tracks global variables only. In some preferred embodiments, the execution recorder accumulates a history of information over a single test only. In other preferred embodiments, the execution recorder accumulates a history of information over multiple executions of a single test or over all executions of tests in the test suite. The history of information comprises interleavings that occurred and occurrences of values of global variables. Test harness 110 comprises a test suite, a system to execute a test from the test suite, and a way to determine if test results are correct using an oracle, as is known in the art. The test suite comprises a set of tests intended to exercise a software under test. Coverage monitor 112 tracks completeness of a set of tests, with regard to ensuring that as many areas as possible of the software under test are tested. An example of a coverage model is described in U.S. patent application Ser. No. 09/731,387, titled "Interleaving Based Coverage Models for Concurrent and Distributed Software," to Ur et al., whose disclosure is assigned to the assignee of the present invention and which is incorporated herein by reference. The application describes a method for determining coverage levels for parallel software.

Active components 118 comprise test harness 110, a replay tool 115, a thread-enabled debugger 116, and, preferably, coverage monitor 112 and an execution controller 114. Test harness 110 and coverage monitor 112 are described above. Execution controller 114 comprises a software tool or method that can force a specified interleaving or variable values during execution of a test.

In some preferred embodiments, execution controller 114 is not active. Circumstances under which automatic execution control is not active comprise the following examples:

No practical way exists to force an interleaving or variable values, and therefore execution controller 114 is not present;

There is no tolerance for bugs in the software and therefore all feasible races must be examined manually; and A definite race bug has already been identified and the developer wishes to control execution manually for the purposes of analyzing and debugging.

Replay tool 115 provides a way to create a deterministic re-run of an execution of SUT 84 and SUT 87, as is known in the art. Thread-enabled debugger 116 comprises a tool that provides debugging functions in a parallel software environment. Debugging functions are well known in the art and include execution control (e.g., single-step, setting breakpoints) and data manipulation (e.g., viewing variable values, setting variable values). It is understood that the functionality of each component may be implemented in a variety of ways including, but not limited to, source code instrumentation and/or a self-contained program. For example, an implementation of a thread-enabled debugger is described in U.S. patent application Ser. No. 09/327379, filed Jun. 8, 1999, titled "A Timing Related Bug Detector," to Azagury et al., which is assigned to the assignee of the present invention and whose disclosure is incorporated herein by reference.

As described in the Background of the Invention, a data race consists of two accesses to the same memory location if at least one of the accesses is a write and the two accesses are not synchronized. Pairs of adjacent accesses to shared memory locations that are not delimited by a synchronizing method are termed minimal race conditions. Referring back to FIG. 4, three accesses to memory location X occur: Thread 1, statement A, Thread 2, statement F, and Thread 1, statement B. Each of the two pairs of accesses, denoted (A,F) and (F,B), is said to be minimal, since no other access intervened in the interleaving depicted in FIG. 4. In a preferred embodiment of the present invention, only those minimal races that adversely affect the final outcome of a parallel program are reported.

Figure 8:
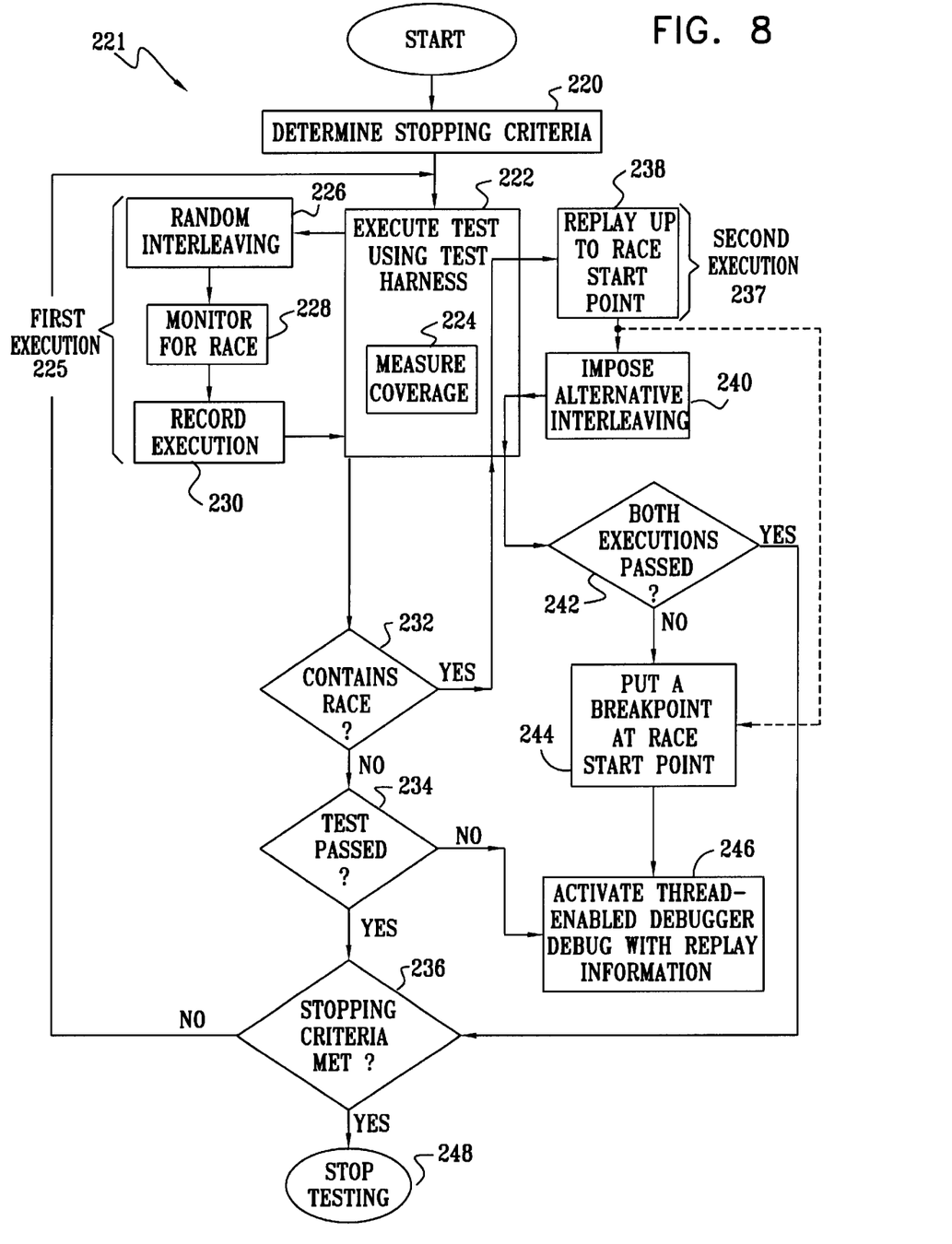
FIG. 8 is a flowchart showing a method for race detection, according to a preferred embodiment of the present invention.

FIG. 8 is a flowchart depicting a process 221 for race detection, according to a preferred embodiment of the present invention. In an initial step 220, criteria for stopping testing are established. The criteria may comprise coverage measurements, time and cost constraints, and other stopping criteria known in the art. In a step 222, a test harness comprising a test suite, a system to execute an SUT under test conditions, and a method for evaluating expected results is implemented. Also in step 222, test conditions are activated in test system software 102 (FIG. 7), specifically in test harness 110. Program 80 (FIG. 6), comprising SUT 84 and SUT 87, executes in an execution step 226.

A first execution group of steps 225 comprises steps 222, 224, 226, 228, and 230. During the first execution of program 80, test interfaces 85 and 88 (FIG. 6) run, optionally operating coverage monitor 112 (FIG. 7) in a measure coverage step 224. Test interfaces 85 and 88 comprise at least some components of test system software 102. In execution step 226, the test runs a random interleaving of the SUT. In a monitoring step 228 comprised in the first execution, race detector 106 detects race conditions and execution recorder 108 records execution information in a step 230. A condition 232 uses the results of monitoring step 228 to check if a race occurred. If no race occurred, a first-execution test outcome is checked in a condition 234. If the first-execution test outcome is determined to be incorrect by comparison with an expected outcome, the defect is analyzed and debugged by a developer. Thus, in a step 246, thread-enabled debugger 116 is activated, and the defect is debugged using recorded execution information generated by step 230. If the first-execution test outcome (condition 234) is correct, a condition 236 checks if the predetermined stopping criteria have been satisfied, i.e., whether enough testing has been performed. If so, the process terminates at a stop testing step 248. If the stopping criteria have not been satisfied, testing continues with a next test from the test suite.

If condition 232 determined that a race occurred in first execution 225, preparations are made in test harness 110 to replay first execution 225 by using results of test system software 102. A second execution 237 comprises re-running test harness execution step 222, coverage measurement step 224, and a replay step 238.

In the second execution, program 80 executes in execution step 222, preferably while coverage monitor 112 is operating in the measure coverage step 224. In execution step 222, interleaving and variable value information recorded by execution recorder 108 are utilized to ensure that an identical interleaving occurs in the replay. Replay step 238 provides a replay up to a point just before a detected race, herein termed a "race start-point", using replay tool 115 of test system software 102. In an alternative interleaving step 240 execution controller 114 imposes an alternative interleaving relative to the race condition. The alternative interleaving comprises generating an alternative sequence between two accesses to a shared memory location at the race start-point, thereby generating a second interleaving.

In some preferred embodiments, the alternative interleaving comprises setting the value of the shared memory location to a prior value, responsive to recorded execution information. Thus, an effect of an alternate interleaving is achieved with altering execution sequence. In some preferred embodiments, recorded execution information forms a history of occurrences of values for a shared memory location. Using this history, the alternative interleaving may be generated by selecting from the history of occurrences of values a value which has appeared infrequently. Such a selection increases the probability of generating unusual conditions, increasing coverage and the probability of discovering defects.

After step 240, execution of SUT 84 and SUT 87 continues to completion in step 222, producing a second-execution outcome. A condition 242 checks if the result of program 80 is correct, that is, if the first-execution outcome and the second-execution outcome correspond to the expected outcome for the test. If they do, the race detected in race monitoring step 228 is assumed to be benign since results produced by the different executions are both correct. If one or both of the first-execution outcome and the second-execution outcome of program 80 is incorrect, a step 244 inserts a breakpoint in program 80 at the race start-point. In step 246, a thread-enabled debugger is activated, enabling the developer to debug with recorded execution information from step 230.

Referring back to FIG. 4 and FIG. 5, a description below shows how process 221 applies to the examples therein. Process 221 performs a first execution 225 under a random interleaving in step 226, monitoring for race in step 228 and recording first-execution information in step 230. Race is detected between statements A and F, since both statements write to a shared memory location X without synchronization. Assuming first execution 225 yielded an interleaving illustrated in FIG. 4, i.e., {A, F, B}, the first-execution outcome is 0. Since a race was detected in condition 232, a second execution using the recorded execution information is performed. The second execution is run to a race start-point (steps 222, 224, and 238), that is, up to, but not including, statement A.

At step 240, an alternative interleaving is forced in step 240 by skipping statement A, continuing execution through statement F, then executing statement A, producing a second-execution outcome. The action of interchanging statements A and F is permissible because {A F} is a minimal race. The resulting interleaving is that presented in FIG. 5.

Alternatively, an alternative interleaving is imposed by forcing the value of shared memory location x to be equal to a prior recorded value from the first execution. In the example of FIG. 4, recorded values of shared memory location X are {0, 7, 0} after the first execution. In the second execution, an alternative interleaving is imposed by forcing statement B to assign the value 7 to X, generating a second-execution outcome of 7.

Replay execution then continues to completion without further interference. The first-execution outcome and the second-execution outcome are checked against an expected outcome in step 242. If an outcome is judged incorrect, the detected race is reported as a defect and debugged in steps 244 and 246. However, if both outcomes are valid, the race is judged benign and is not reported as a defect.

As shown in FIG. 8, process 221 identifies races causing defects, and race artifacts are not reported. The process makes use of software tools known in the art, with the addition of coupling the tools to produce a transfer of information between the tools, not heretofore implemented. The coupling of the tools may take a plurality of forms, as will be apparent to those versed in the art.

In some preferred embodiments of the present invention, the test suite implemented in step 222 of process 221 comprises a plurality of tests using identical input data but compelling alternative interleavings through the use of irritators. Such a plurality of tests increases the probability of reaching race conditions. An example is described in *Multithreaded Java Program Test Generation by Edelstein*, et al. where the sleep( ) primitive was used effectively to generate tests containing alternative interleavings, which in turn revealed software defects.

Advantages obtained by utilizing the technique of the present invention over hitherto known techniques include, among others:

Each race reported is known to cause an incorrect outcome of the software, i.e., false alarms are not reported;

Developer effort is focused on debugging real defects, not on establishing whether a reported race is a flaw;

Improved reliability in true race reporting encourages use of testing tools, which increases overall software reliability. Developers tend to avoid tools that report false alarms, since the effort involved in isolating the true defects from among the artifacts is perceived to be too great.

Replaying to a race start-point before launching a debugger greatly enhances the convenience and efficiency of race debugging.

It will be appreciated that preferred embodiments of the present invention have a plurality of variations, including, but not limited to, omission of coverage monitor 112, omission of execution controller 114, inclusion of other software development and debugging tools known in the art, alternative criteria for stopping testing, utilization of irritators for the generation of test cases, and automatic or manual determination of the correctness of test outcomes. Other variations will be apparent to those skilled in the art.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for race detection in parallel software, comprising:

performing an execution of software under test (SUT) having an expected outcome;

detecting a race condition in the SUT responsive to a first interleaving generated during the execution;

replaying the first interleaving to a start-point of the race condition;

imposing a second interleaving at the start-point of the race condition;

determining a second-execution outcome of the SUT responsive to the second interleaving; and comparing the expected outcome with the second-execution outcome.

2. A method according to claim 1, wherein performing the execution comprises generating a first-execution outcome, and comprising comparing the first-execution outcome with the expected outcome.

3. A method according to claim 2, and comprising reporting the race condition as a program defect responsive to the first-execution outcome with the expected outcome comparison and the expected outcome with the second-execution outcome comparison.

4. A method according to claim 2, wherein comparing the first-execution outcome with the expected outcome comprises activating a thread-enabled debugger responsive to the comparison.

5. A method according to claim 1, wherein performing the execution comprises recording interleaving and variable values.

6. A method according to claim 5, wherein recording interleaving and variable values comprises generating a history of occurrences of values over a single execution of a test.

7. A method according to claim 5, wherein recording interleaving and variable values comprises generating a history of occurrences of values over multiple executions of at least one test.

8. A method according to claim 7, wherein generating the history comprises selecting a previous value and assigning the previous value to a shared memory location.

9. A method according to claim 8, wherein selecting the previous value comprises selecting the value from the history of occurrences of values responsive to a frequency of occurrences of the value.

10. A method according to claim 1, wherein the second interleaving comprises a reversal of an order of accesses to a shared memory location generated responsive to the first interleaving.

11. A method according to claim 1, wherein imposing the second interleaving comprises assigning an alternative value to a shared memory location corresponding to a prior recorded value.

12. A method according to claim 1, wherein the SUT comprises a program having a plurality of threads.

13. A method according to claim 1, wherein the SUT comprises a program running on one or more central processing units (CPUs).

14. A method according to claim 1, wherein the SUT comprises a program running in a distributed environment.

15. A method according to claim 1, wherein the race condition comprises a program defect.

16. A method according to claim 15, wherein the program defect does not comprise a false alarm.

17. A method according to claim 1, wherein detecting the race condition comprises identifying the race condition as a minimal race.

18. A method according to claim 1, wherein performing the execution comprises choosing a test condition from a predetermined test suite in a test harness tool, and executing the SUT under the test condition.

19. A method according to claim 18, wherein the predetermined test suite comprises one or more test variations generated by irritators.

20. A method according to claim 1, wherein performing the execution of the SUT comprises:

establishing a predetermined coverage requirement; and halting the execution after the predetermined coverage requirement has been satisfied.

21. A method according to claim 1, wherein performing the execution of the SUT comprises:

establishing a predetermined stopping criterion; and halting the execution after the predetermined stopping criterion has been satisfied.

22. A method according to claim 1, and comprising:

setting a breakpoint at the race condition start-point;

activating a debugger; and operating the debugger so as to control continued execution of the SUT.

23. A method according to claim 1, and comprising providing a test system software having a plurality of software development and debugging tools chosen from a race detection tool, an execution recording and replay tool, an execution control tool, a thread-enabled debugger tool, a coverage measurement tool, and a test harness tool, and wherein performing the execution of the SUT comprises coupling the tools in a predetermined manner.

24. A method according to claim 23, wherein coupling the tools comprises transferring information among the software development and debugging tools so as to perform replaying the first interleaving to the race condition start-point.

25. A method according to claim 23, wherein coupling the tools comprises transferring information among the software development and debugging tools so as to perform imposing the second interleaving at the race condition start-point.

26. A method according to claim 23, wherein coupling the tools comprises:

setting a breakpoint at the race condition start-point; and activating the thread-enabled debugger tool.

27. A method according to claim 23, wherein coupling the tools comprises transferring information among the software development and debugging tools so as to perform comparing the expected outcome with the second-execution outcome.

28. A method for debugging a race condition, comprising:

executing software-under-test (SUT);

activating a race detection tool, a replay tool, a thread-enabled debugging tool, and a test harness tool responsive to execution of the SUT;

coupling the tools to produce a transfer of information therebetween; and debugging the race condition responsive to the transfer of information.

29. A method according to claim 28, wherein the SUT comprises a program having a plurality of threads.

30. A method according to claim 28, wherein the SUT comprises a program running on one or more central processing units (CPUs).

31. A method according to claim 28, wherein the SUT comprises a program running in a distributed environment.

32. A method according to claim 28, wherein the race condition comprises a program defect.

33. A method according to claim 28, wherein debugging the race condition comprises identifying the race condition as a minimal race.

34. A method according to claim 28, wherein executing the SUT comprises executing the SUT under a test condition chosen from a predetermined test suite in the test harness tool.

35. A method according to claim 34, wherein the test suite comprises a first plurality of test variations using irritators, and wherein executing the SUT comprises generating a second plurality of interleavings responsive to the first plurality of test variations.

36. A method according to claim 28, wherein executing the SUT comprises halting execution of the SUT after a predetermined coverage requirement has been satisfied.

37. A method according to claim 28, wherein executing the SUT comprises halting execution of the SUT after a predetermined stopping criterion has been satisfied.

38. A method according to claim 28, and comprising activating the thread-enabled debugging tool at a start-point of the race condition.

39. A method according to claim 38, and comprising controlling continued execution of the SUT responsive to the debugging tool.

40. A method according to claim 28, wherein executing the SUT comprises activating an execution recorder tool, and wherein coupling the tools comprises transferring information between the execution recorder tool and at least one of the race detection tool, the replay tool, the thread-enabled debugging tool, and the test harness tool.

41. A method according to claim 40, and comprising:

transferring information between the execution recorder, the replay tool, the test harness tool, and the race detection tool; and replaying a first interleaving of the SUT to a start-point of the race condition responsive to the transferring of information.

42. A method according to claim 41, and comprising activating the thread-enabled debugging tool responsive to the transferring of information.

43. A method according to claim 41, wherein the test harness tool is responsive to the transferring of information.

44. Apparatus for race detection in parallel software, comprising a computing system which is adapted to perform an execution of software under test (SUT) having an expected outcome, detect a race condition in the SUT responsive to a first interleaving generated during the execution, replay the first interleaving to a start-point of the race condition, impose a second interleaving at the start-point of the race condition, determine a second-execution outcome of the SUT responsive to the second interleaving, and compare the expected outcome with the second-execution outcome.

45. Apparatus for debugging a race condition, comprising:

a computer system which is adapted to execute software-under-test (SUT);

a plurality of software tools comprising a race detection tool, a replay tool, a thread-enabled debugging tool, and a test harness tool, the tools being activated by the computer system responsive to the execution of the SUT; and a coupling which connects the plurality of tools to produce a transfer of information therebetween responsive to the execution of the SUT, so that the computer system is able to debug the race condition responsive to the transfer of information.

46. A computer software product for race detection in parallel software, comprising a computer-readable medium having computer program instructions recorded therein, which instructions, when read by a computer, cause the computer to perform an execution of software under test (SUT) having an expected outcome, detect a race condition in the SUT responsive to a first interleaving generated during the execution, replay the first interleaving to a start-point of the race condition, impose a second interleaving at the start-point of the race condition, determine a second-execution outcome of the SUT responsive to the second interleaving, and compare the expected outcome with the second-execution outcome.

47. A computer software product for debugging a race condition, comprising a computer-readable medium having computer program instructions recorded therein, which instructions, when read by a computer, cause the computer to execute software under test (SUT), activate a race detection tool, a replay tool, a thread-enabled debugging tool, and a test harness tool responsive to execution of the SUT, couple the tools to produce a transfer of information therebetween, and debug the race condition responsive to the transfer of information.

* * * * *